May 10, 1966 G. S. FUGIT 3,250,485

REEL HUB LOCK

Filed April 16, 1964 2 Sheets-Sheet 1

INVENTOR.
GUY S. FUGIT
BY Douglas W. Clarkson
ATTORNEY

May 10, 1966 G. S. FUGIT 3,250,485

REEL HUB LOCK

Filed April 16, 1964 2 Sheets-Sheet 2

INVENTOR.
GUY S. FUGIT

BY Douglas M. Clarkson
ATTORNEY 3,250,485

REEL HUB LOCK

Guy S. Fugit, 31 Hill Lane, Levittown, Long Island, N.Y.

Filed Apr. 16, 1964, Ser. No. 360,206

6 Claims. (Cl. 242—68.3)

This invention, generally, relates to reel hub locks and, more particularly, to an improved reel hub lock for heavy reels such as those used on magnetic tape transports.

In many applications such as, for example, the storage of data for use with computers, very large reels of magnetic tape are used. Such reels are removably supported on drive shafts which must be capable of stopping and starting in the order of milliseconds.

With large reels carrying long lengths of magnetic tape that are quite heavy, the angular moment of inertia is extremely high. Thus, each reel must be secured positively to its drive shaft to permit the desired acceleration torques to be developed without slippage which would cause undesired slack in the tape feed mechanisms. In addition, it is desired that the mounting assemblies for such reels be of such nature as to permit quick removal of the reels in a simple and expedient fashion.

It is, therefore, an important object of the present invention to provide a reel hub lock which will securely hold a large reel carrying magnetic tape and which can be quickly unlocked for removing the reel.

It is a further object of the present invention to provide a reel hub lock for mounting heavy reels while permitting the reel to be removed from the hub without disassembly of the hub mounting arrangement.

Briefly, a reel hub assembly constructed in accordance with the principles of the invention has a keyed aperture for engaging and positive connection with a drive shaft. The hub assembly is provided with a radially extending flange and an axially extending spindle, and a sleeve of resilient material such as rubber is positioned over the spindle, which sleeve is dimensioned to closely approximate the internal bore of the central hole in a tape reel.

A knob mounting member is threaded into the spindle and, adjacent the outer end, a cup-shaped member is positioned so that its rim bears against the resilient sleeve. Rotation of the knob mounting member will force the rim of the cup-shaped member against the resilient sleeve squeezing it and causing it to expand radially into tight engagement with the internal bore of a tape reel. In addition, the tape reel is gripped between the knob itself and the radially extending flange.

To permit removal of a tape reel, the knob is rotated counterclockwise and pivoted into a plane parallel with the axis of the knob mounting member. A tape reel then may be slipped readily over the knob.

Having described the invention briefly, it will be described in more detail along with other objects and advantages in the following specification, which may best be understood by reference to the accompanying drawings, of which:

Figure 1:
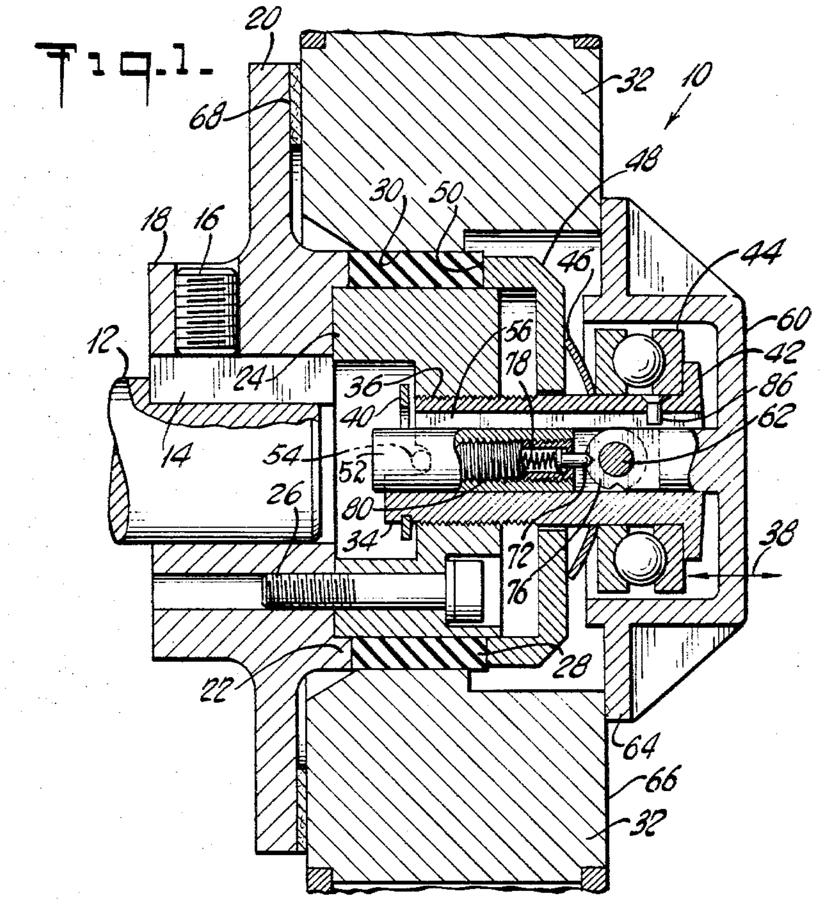
FIG. 1 is a vertical section view of a reel mounting hub assembly in accordance with the present invention.

In the figures, there is shown a reel mounting hub assembly 10 mounted on a drive shaft 12 by means of key 14 and a set screw 16. A key hub member 18 is provided with a radially extending flange 20 integrally formed therewith and an axially extending shoulder 22.

A spindle 24 is securely affixed to the hub member 18 by one or more bolts 26. The spindle 24 is formed of a suitable rigid material, such as steel.

An annular sleeve 28 of deformable material, such as rubber, is positioned on the spindle 24 with one end thereof bearing against the shoulder 22. The outer diameter of the sleeve 28 is proportioned to receive the inner spindle aperture 30 of a tape reel 32.

A hollow drive tube 34 is threaded into the spindle 24 by coaction of the threaded surface 36. Rotation of the drive tube 34 will move the drive tube into and out of the spindle 24 as indicated by arrows 38. The outward travel of the tube is limited by a C-clamp 40 positioned on the inner end of the drive tube 34.

The outer end of the drive tube 34 is provided with a radially extending shoulder 42 which transmits axial motion through an anti-friction device consisting of a thrust bearing 44 to a Belleville spring 46, the outer periphery of which bears against a thrust cup 48 having a thrust rim 50 bearing on the other end of the sleeve 28. To permit the hollow drive tube 34 to rotate to move the drive tube 34 into and out of the spindle 24, a shaft 52 having a radially extending pin 54 is provided.

Figure 4:
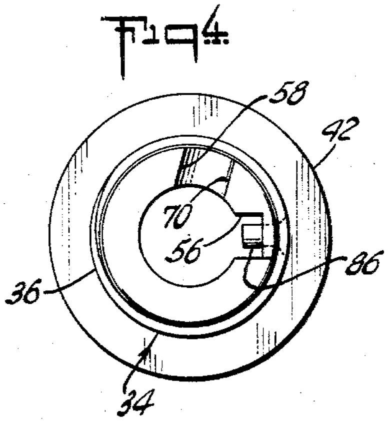
FIG. 4 is an end view of the knob mounting member shown in the assembly of FIG. 1.

The pin 54 slides within a keyway 56 and, upon clearance of the pin 54 at the end of the keyway, rotation of the shaft 52 will move the pin 54 into engagement with a shoulder 58 FIG. 4 thereby to ensure conjoint rotation of the shaft 52 and the drive tube 34. Rotation of the shaft 52 is provided by means of a knob 60 which is coupled to shaft 52 by a pin 62.

*Operation*

As the knob 60 is tightened, the shaft 52 will be rotated and the pin 54 will rotate the drive tube 34 causing the drive tube to move into the spindle 24. The inward movement of drive tube 34 will be transmitted through the shoulder 42, through the thrust bearing 44, through the Belleville spring 46 and to the thrust cup 48 causing the rim 50 to squeeze against the sleeve 28.

Figure 2:
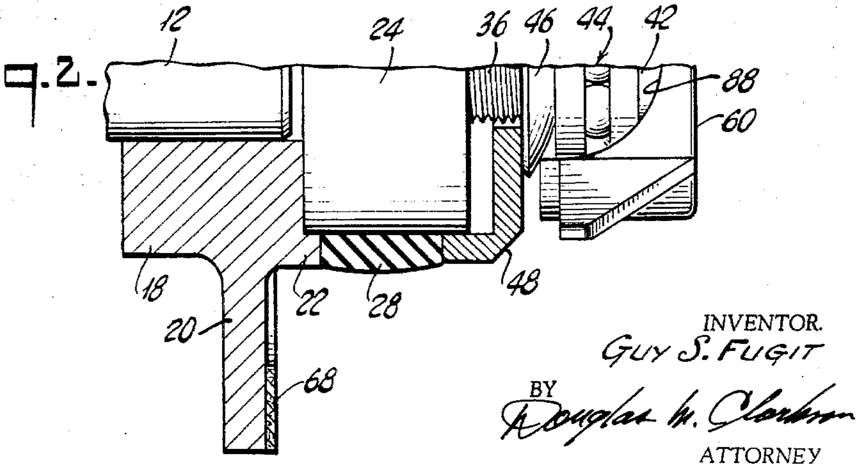
FIG. 2 is a section view of a portion of the assembly shown in FIG. 1 illustrating operation thereof.
Figure 3:
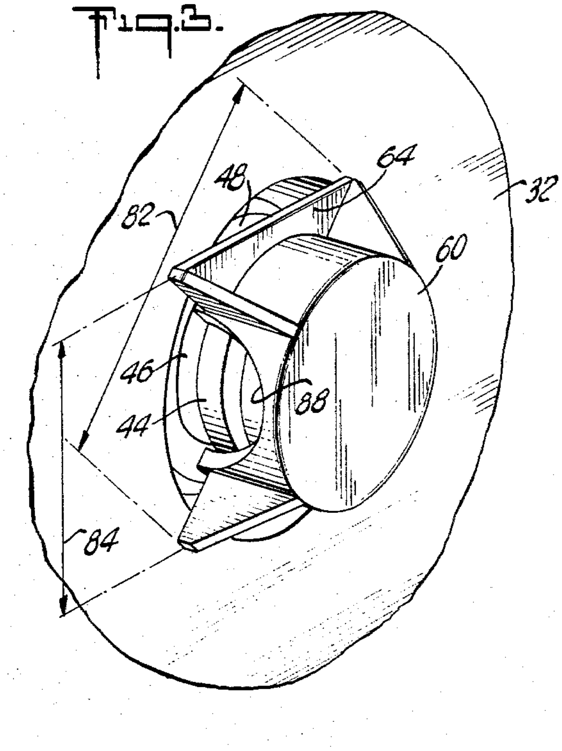
FIG. 3 is a perspective view of the knob shown in FIG. 1.

As the sleeve 28 is squeezed between the shoulder 22 and the thrust cup 48, it will tend to deform and expand outwardly, as best illustrated in FIG. 2, to tightly engage the inner spindle aperture 30 of the tape reel 32. Rotation of the knob 60 also causes its corners 64 to engage the outer surface 66 of the tape reel 32, clamping the reel 32 tightly between the corners 64, and the radially extending flange 20 of the hub.

The Belleville spring 46 permits inward movement of the knob 60 after full deformation of sleeve 28 although such movement is very slight. The frictional engagement of the tape reel 32 with the flange 20 is augmented by an annular gasket 68 about the face of the flange 20.

Thus, in the clamped position, the tape reel 32 is secured to the hub 10 and, thus, to the shaft 12 both by clamping forces bearing on the opposite surfaces of the reel and by the expansion of the sleeve 28 gripping the inner bore of the reel. The Belleville spring 46 will take up any differences in distance traveled for secure engagement of both clamping means.

By such clamping, a greatly increased clamping force is provided over the usual face clamping arrangements of the art, and large reels having long lengths of magnetic tape wound thereon may be rotatably driven by the shaft 12 in a quick start-stop mode of operation without slippage of the reel on the shaft.

Figure 5:
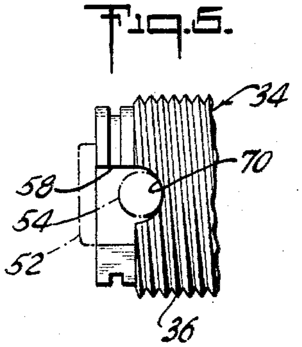
FIG. 5 is a top view of the end of the member shown in FIG. 4.

To remove the tape reel, the knob 60 is backed off. In the clamping position, pin 54 is received in the semi-circular seat 70 as best seen in FIG. 5. Thus, as the knob is backed off, the pin 54 will assert a force on the drive tube 34 to rotate the drive tube in a counter-clockwise direction, moving the drive tube outwardly from the spindle 24.

The outward rotation continues until the sleeve 28 is returned to its undeformed state and until the load is removed from the Belleville spring 46. When this happens, the forces driving the pin 54 into the seat 70 are removed and the shaft 52 can rotate with respect to drive tube 34 until the pin 54 is aligned with the keyway 56.

Figure 6:
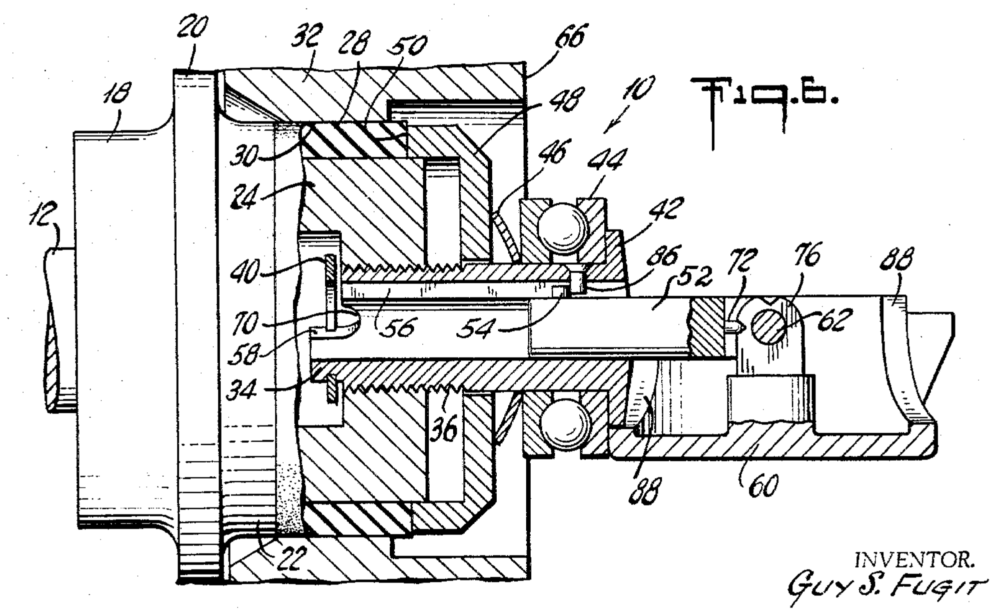
FIG. 6 is a view in cross section of the hub assembly showing the operation of the knob to permit mounting and removal of a tape reel.

Then, the knob 60 may be pulled out with the pin 54 traveling down the axially extending keyway 56 in the drive tube 34 until the pin 54 is blocked by a stop, such as a pin 86. At that time, the knob 60 may be rotated about the pin 62 until the detent 72 engages a notch in the member 76, as shown in FIG. 6. The force of the detent 72 may be adjusted by means of the strength of a spring 78 and the insertion distance of a screw 80.

The knob 60 is substantially square with its diagonal distance indicated by an arrow 82 being greater than the diameter of the reel spindle aperture 30. However, the transverse dimension indicated by an arrow 84 is less than the diameter of the reel spindle aperture.

Thus, when the knob 60 is rotated about the axis of the pin 62, the transverse dimension 84 will be presented to the reel aperture 30, and a reel 32 can be removed by sliding it over the rotated knob. A cut-out portion 88 of the knob 60 permits the formation of a surface to butt against the edge of the shoulder 42.

Thus, removal of a tape reel is simple and quick. Further, disassembly of any part of the hub is not required for reel removal, thereby eliminating the obvious hazard of having parts lost or misplaced.

This invention may be variously modified and embodied within the scope of the subjoined claims.

What is claimed is:

1. A reel hub lock for mounting a reel to a shaft, comprising, a hub having a radially extending flange and an annular axially extending shoulder and including means for attaching to a drive shaft, a spindle including means for mounting on said hub in axially extending relationship thereto, a deformable sleeve mounted on said spindle with one edge engaging said shoulder on said hub, a thrust cup having a rim for engagement with the opposite edge of the deformable sleeve, a hollow drive tube threadably engaged within said spindle, the outer end of said drive tube having a shoulder integrally formed thereon, a thrust bearing and spring means coupling said shoulder to said thrust cup to transmit axial movement of said drive tube to said sleeve, a shaft rotatably mounted within said hollow drive tube, a knob coupled to the outer end of said drive tube, means coupling said shaft to said tube to transmit rotative motion of said shaft to said tube and to permit relative axial motion therebetween, and said knob having a diagonal dimension greater than the spindle aperture of said reel so that as said knob is rotated, the drive tube will move axially to clamp and deform said sleeve into gripping engagement with the spindle aperture and so that said knob will clamp the reel between the knob and said radial flange on said hub.

2. An assembly in accordance with claim 1 in which said means coupling said drive shaft to said tube comprises a radially extending pin on said shaft, said tube being provided with an axially extending keyway within which said pin moves for relative axial movement therebetween, said keyway terminating in a seat to receive said pin and to transmit rotary motion from said shaft to said tube.

3. An assembly in accordance with claim 1 in which said knob is dimensioned so that the transverse dimension is less than the diameter of the spindle aperture and the diagonal dimension is greater than the diameter of the spindle aperture and in which said knob is pivotally coupled to said shaft so that the knob can be pivoted about a transverse dimension to enable placement or removal of the reel over the knob.

4. An assembly in accordance with claim 1 in which stop means are provided on said drive tube to limit the distance of outward movement of said tube.

5. An assembly in accordance with claim 3 which includes a spring loaded detent pin to locate said knob perpendicular to said shaft and when pivoted parallel with the axis of said shaft.

6. An assembly in accordance with claim 1 which includes an annular gasket on said radial flange to engage said reel.

References Cited by the Examiner

UNITED STATES PATENTS

| | | | |
|---|---|---|---|
| 2,537,263 | 1/1951 | Fogle. | |
| 2,564,746 | 8/1951 | Bauer | 242—68.3 X |
| 2,657,866 | 11/1953 | Lungstrom | 242—68.3 X |
| 3,083,927 | 4/1963 | Prosin | 242—68.3 |

MERVIN STEIN, *Primary Examiner.*

N. L. MINTZ, *Assistant Examiner.*